United States Patent [19]

Barraclough

[11] Patent Number: 4,624,820
[45] Date of Patent: Nov. 25, 1986

[54] MOLDING OF COMPOSITE MATERIALS

[75] Inventor: David J. Barraclough, Derby, England

[73] Assignee: Rolls-Royce plc, London, England

[21] Appl. No.: 729,871

[22] Filed: May 2, 1985

[30] Foreign Application Priority Data

Jun. 22, 1984 [GB] United Kingdom ............... 8415959

[51] Int. Cl.$^4$ ............................................. B29C 47/06
[52] U.S. Cl. .................................... 264/512; 264/40.5; 264/137; 264/258; 264/313; 264/102; 264/510; 425/149
[58] Field of Search ............... 264/2.2, 40.5, 137, 264/257, 258, 272.13, 313, 314, 316, 512, 513, 102, 510; 425/149

[56] References Cited

U.S. PATENT DOCUMENTS

| | | | |
|---|---|---|---|
| 2,401,180 | 5/1946 | Parmelee | 264/137 |
| 4,167,430 | 9/1979 | Arachi | 264/313 |
| 4,271,116 | 6/1981 | Jones | 264/313 |

*Primary Examiner*—Donald Czaja
*Assistant Examiner*—Harold Pyon
*Attorney, Agent, or Firm*—Cushman, Darby & Cushman

[57] ABSTRACT

A method of molding a composite material comprising reinforcing fibres enclosed in a resin matrix. Layers of the resin impregnated fibres are laid-up in a suitably shaped die whereupon the laid-up layers are overlaid by a silicone rubber member which generally corresponds in shape with the die. Hydraulic pressure is exerted upon the silicone rubber member so that it urges the laid-up fibres into the configuration of the die. The whole molding apparatus is placed in an oven and its temperature is raised to that at which consolidation of the laid-up fibres occurs and the resin cures. The exerted hydraulic pressure is progressively reduced during heating as the silicone rubber member thermally expands so as to ensure that the pressure exerted by the silicone rubber member upon the laid-up fibres remains substantially constant.

6 Claims, 1 Drawing Figure

U.S. Patent  Nov. 25, 1986  4,624,820
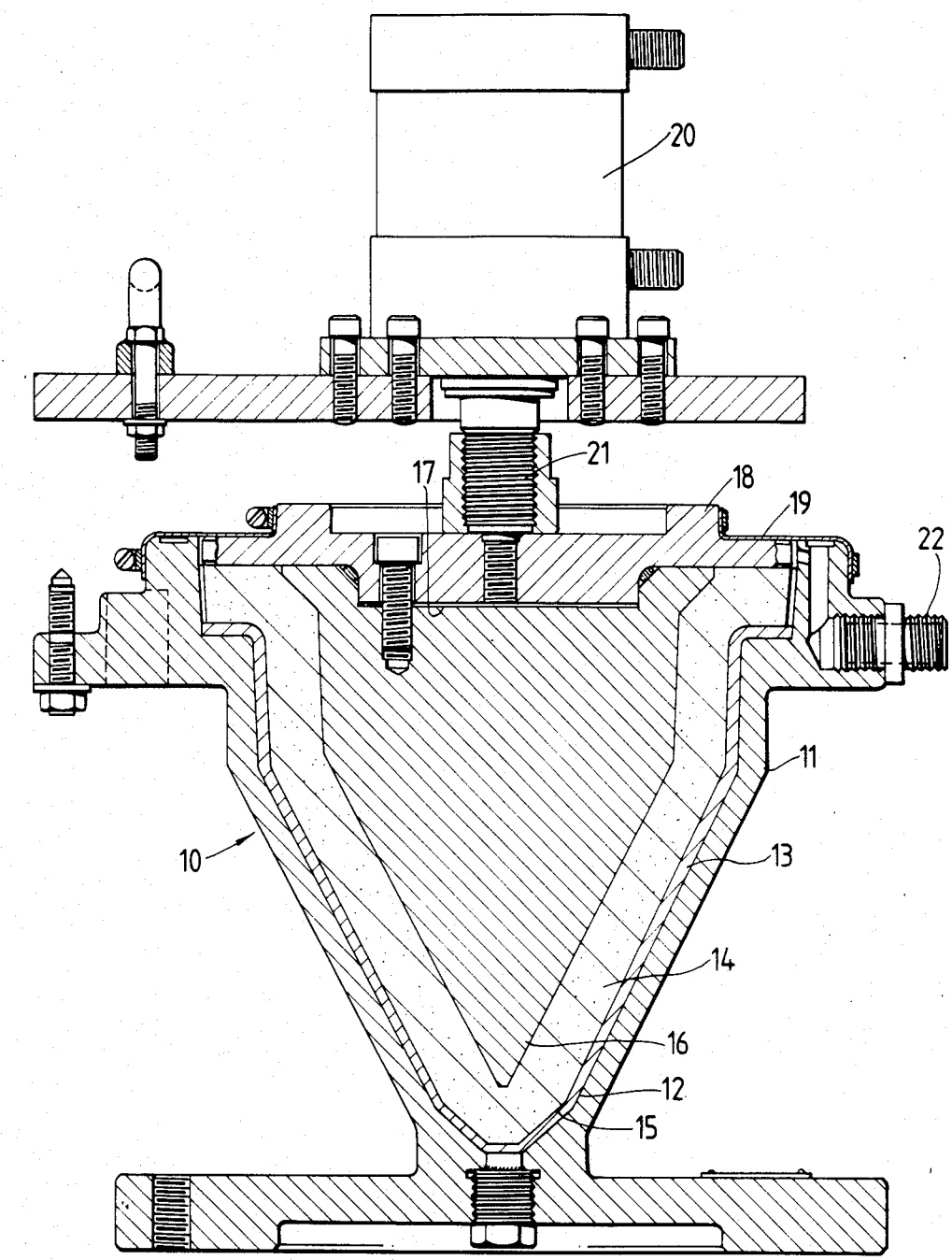

MOLDING OF COMPOSITE MATERIALS

This invention relates to the molding of composite materials.

It is known to manufacture components, such as gas turbine engine nose spinners, from composite materials by placing reinforcing fibres in a suitably shaped mold and then injecting an appropriate resin into the mold so as to impregnate the fibres therewith. Special precautions have to be taken however in order to ensure that the fibres remain in the desired configuration.

An alternative method of manufacture is to lay-up layers of fibres which have been pre-impregnated with a resin binder in a suitably shaped die and then mold the laid-up fibres by the rubber expansion method. In that method the laid-up fibres are compressed by a suitably shaped silicone rubber member and the whole assembly heated so that the rubber expands to exert further pressure upon the fibres so that they consolidate and the resin cures. The drawback with this technique is that very little control can be exerted over the pressure which the rubber exerts upon the laid-up fibres.

A yet further method of manufacture is to compress laid-up fibres between matched dies. However, this method is only suitable for use in the manufacture of certain suitably shaped components.

It is an object of the present invention to provide a method of molding composite materials which is a variation and improvement upon the rubber expansion technique.

According to the present invention, a method of molding a composite material comprises laying up a plurality of layers of resin impregnated fibres in a suitably shaped die, overlaying said laid-up impregnated fibres with a resilient deformable member generally corresponding in shape with that of said die, preheating the assembly to a temperature below that at which said resin cures, exerting pressure upon said resilient deformable member so that is deforms to urge said laid-up resin impregnated fibres into the configuration of said die, heating the assembly so that said resilient deformable member thermally expands to increase the pressure exerted thereby upon said resin impregnated laid-up fibres whilst simultaneously decreasing the pressure exerted upon said resilient deformable member at such a rate that the pressure exerted by said resilient deformable member upon said resin impregnated laid-up fibres remains substantially constant and continuing the heating of said resin impregnated fibres and the maintenance of the exertion of said substantially constant pressure thereon until said resin impregnated laid-up fibres have been consolidated.

The invention will now be described, by way of example, with reference to the accompanying drawing which is a sectioned side view of apparatus for use in the method of the present invention.

With reference to the drawing, the molding apparatus generally indicated at 10 comprises a metal die 11 the interior surface 12 of which is so shaped as to define the exterior configuration of the nose spinner of a gas turbine engine. The die surface 12 has a laid-up thereon a plurality of layers 13 of epoxy resin impregnated glass fibres. The layers 13 are in turn overlaid by a silicone rubber member 14 the exterior surface 15 of which corresponds generally in shape with the interior surface 12 of the die 11. The silicone rubber member 14 is of generally constant thickness so as to enable it to receive a metal insert 16. The metal insert is provided with a reception feature 17 which enables it to receive a pressure plate 18. An air-tight seal is provided between the pressure plate 18 and the die 11 by an annular rubber diaphragm 19. A hydraulic ram 20 is positioned above the pressure plate 18 so that its actuating piston 21 bears upon the upper surface of the pressure plate 18.

In accordance with the method of the present invention, the moulding apparatus 10 is placed in a suitable oven (not shown) and the interior of the die 11 is evacuated via a port 22 provided therein. The temperature of the oven is then raised to a level which is below that at which the resin cures in order to allow the whole molding apparatus 10 to attain a constant temperature and the silicone rubber member to expand to a certain degree. A suitable temperature is 120° C. The hydraulic ram 20 is then actuated to exert pressure upon the pressure plate 18 and thus upon the metal insert 16. The metal insert 16 in turn exerts pressure upon the silicone rubber member 14 so that the silicone rubber member 14 deforms to urge the laid-up resin impregnated glass fibre layers 13 against the die internal surface 12 so that the layers 13 adopt the configuration of the die 11. The pressure exerted by the hydraulic ram 20 is that which is necessary to cause the silicone rubber member 14 to exert sufficient pressure upon the glass fibre layers 13 to consolidate them at elevated temperature. Thus we have found that a ram pressure of 550 pounds per square inch which results in the silicone rubber member 14 exerting a pressure of 80 pounds per square inch upon the layers 13 is sufficient to achieve consolidation at elevated temperature. When the consolidation pressure has been reached, the temperature of the oven is increased to that which is necessary to result in the curing of the epoxy resin and consolidation of the glass fibre layers 13. In the case of the particular epoxy resin used to impregnate the glass fibres in the layers 13, this temperature is 175° C.

As the temperature of the moulding apparatus 10 increases the silicone rubber member 14 thermally expands which in turn, since the member 16 is constrained by the pressure plate 18, results in an increase in the pressure exerted by the member 14 upon the glass fibre layers 13. However as soon as this begins to occur, the pressure exerted by the hydraulic ram is reduced so that pressure which it exerts upon the pressure plate 18, and hence the pressure which the silicone rubber member 14 exerts upon the glass fibre layers 13 remain substantially constant at the 550 and 80 pounds per square inch values respectively. This pressure reduction may be effected manually although we prefer that the operation is performed automatically by an appropriate control system. The pressure upon the glass fibre layers 13 is maintained until the layers 13 are consolidated and the epoxy resin cures, whereupon the pressure is relieved, the moulding apparatus 10 taken out of the oven and the resultant molded nose spinner removed from the die 11.

It will be appreciated that although the present invention has been described with reference to the molding of a composite material which comprises a thermosetting resin, it is also applicable to composite materials which comprise a thermoplastic resin. In such a situation, the application of pressure would of course only be necessary to achieve consolidation of the layers 13, not resin curing.

I claim:

1. A method of molding a composite material comprising laying up a plurality of layers of resin impregnated fibres in a suitable shaped die, overlaying said resin impregnated fibres with a resilient deformable member generally corresponding in shape with that of said die, preheating the assembly at a temperature below that at which the resin cures, exerting pressure upon said resilient deformable member so that it deforms to urge said laid-up resin impregnated fibres into the configuration of said die, heating the assembly so that said resilient deformable member thermally expands to increase the pressure exerted thereby upon said resin impregnated laid-up fibres whilst simultaneously decreasing the pressure exerted upon said resilient deformable member at such a rate that the pressure exerted by said resilient deformable member upon said resin impregnated laid-up fibres remains substantially constant and continuing the heating of said resin impregnated fibres and the maintenance of the exertion of said substantially constant pressure thereon until said laid-up resin impregnated fibres have been consolidated.

2. A method of molding a composite material as claimed in claim 1 wherein said fibres are impregnated with a thermosetting resin and the heating of said resin impregnated fibres and the maintenance of said substantially constant pressure thereon are continued until said fibres have been consolidated and said resin has cured.

3. A method of molding a composite material as claimed in claim 1 wherein said pressure applied to said resilient deformable member is applied by hydraulically operated means.

4. A method of molding a composite material as claimed in claim 1 wherein the region between said die and said resilient deformable member which is occupied by said resin impregnated fibres is evacuated prior to the application of heat and pressure to said resin impregnated fibres.

5. A method of molding a composite material as claimed in claim 1 wherein said resilient deformable member is formed from a silicone rubber.

6. A method of molding a composite material as claimed in claim 1 wherein said die is so shaped that said composite material is molded into the shape of a nose spinner for a gas turbine engine.

* * * * *